US006282466B1

(12) United States Patent
Nolte et al.

(10) Patent No.: US 6,282,466 B1
(45) Date of Patent: Aug. 28, 2001

(54) METHOD OF AUTOMATED THRUST-BASED ROLL GUIDANCE LIMITING

(75) Inventors: Edward P. Nolte, Seattle; Michael J. Myers, Everett; David C. Coombs, Langley; John C. Griffin, III, Tacoma, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/185,424

(22) Filed: Nov. 3, 1998

(51) Int. Cl.$^7$ ................................ G06F 7/00; G05D 3/00
(52) U.S. Cl. ................................ 701/11; 701/4; 701/14; 701/3; 244/76 R; 244/180; 244/178; 340/963; 340/96
(58) Field of Search ................................ 701/3, 4, 5, 6, 701/7, 8, 9, 10, 11, 14; 340/961, 963, 970, 972, 965, 969, 967, 974, 975, 973; 342/26, 179, 197, 181; 244/180, 194, 195, 179, 178, 181, 177, 182, 75 R, 51, 7 R, 186, 184, 190

(56) References Cited

U.S. PATENT DOCUMENTS

| 4,247,843 | * | 1/1981 | Miller et al. | 340/973 |
|---|---|---|---|---|
| 4,354,240 | * | 10/1982 | Olive | 701/4 |
| 4,536,843 | | 8/1985 | Lambregts | 701/3 |
| 4,553,210 | | 11/1985 | Centala | 701/7 |
| 4,939,513 | * | 7/1990 | Paterson et al. | 340/970 |
| 5,008,825 | * | 4/1991 | Nadkarni et al. | 701/4 |
| 5,050,086 | * | 9/1991 | Lambregts | 701/4 |
| 5,060,889 | * | 10/1991 | Nadkarni et al. | 244/183 |
| 5,079,711 | | 1/1992 | Lambregts et al. | 701/3 |
| 5,096,146 | | 3/1992 | Orgun et al. | 244/179 |
| 5,225,829 | * | 7/1993 | Bateman | 340/967 |
| 5,365,446 | | 11/1994 | Farineau et al. | 701/3 |
| 5,386,954 | | 2/1995 | Bissey et al. | 244/181 |
| 5,695,156 | | 12/1997 | Firuz et al. | 244/180 |
| 5,828,332 | * | 10/1998 | Frederick | 342/26 |
| 5,920,276 | * | 7/1999 | Frederick | 342/26 |
| 5,927,655 | * | 7/1999 | Larramendy et al. | 244/195 |

FOREIGN PATENT DOCUMENTS

2315138 A    1/1998  (GB).

* cited by examiner

Primary Examiner—Jacques H. Louis-Jacques
(74) Attorney, Agent, or Firm—Christensen O'Connor Johnson Kindness PLLC

(57) ABSTRACT

An improvement to a method of automatic flight using a flight management system is provided. The flight management system includes a lateral navigation (LNAV) control mode in which the flight management system provides roll commands via a flight director system to the pilot during manual flight or to an autopilot during autoflight to effectuate lateral flight guidance. The improvement includes evaluating the energy state of the airplane during the LNAV control mode, calculating a Thrust Based Roll Limit (TBRL), and providing an appropriately limited bank angle command signal via the flight director system for use by the pilot during manual flight or to the autopilot during autoflight while flying in a thrust-limited condition. The TBRL is calculated as a function of the energy state of the airplane. The use of the TBRL to limit the bank angle command signal avoids an uncommanded change in altitude and/or airspeed.

19 Claims, 7 Drawing Sheets

CALCULATE TBRL

METHOD OF AUTOMATED THRUST-BASED ROLL GUIDANCE LIMITING

FIELD OF THE INVENTION

The present invention relates to aircraft control systems, and more particularly, to methods for automatically controlling commanded operation of an aircraft within a roll angle limit during certain flight situations.

BACKGROUND OF THE INVENTION

In the past, the practical altitude ceiling at which an airplane can operate has been limited by the maneuver margin to stall (typically 1.3 g to initial buffet), which historically has been primarily a function of the efficiency of the aircraft's wing. Optimization of aerodynamic design techniques in manufacturing processes introduced in the 1990s have resulted in substantial increases in the efficiency of airplane wings. In some aircraft, the efficiency of the wing is such that the practical altitude ceiling during certain turn maneuvers is limited not by the ability of the wings to continue providing sufficient lift, but instead by the thrust available from the engines. Simplistically, the airplane engines run out of energy before the wings run out of lift. This situation is further aggravated by the marked decrease in available thrust that occurs in modern, fuel efficient high-bypass ratio turbofan engines at high altitudes and Mach numbers.

Some designers have addressed this problem by restricting the maximum altitude at which the airplane can operate. This unnecessarily penalizes the performance of the airplane and can result in increased fuel consumption, reduced payload, and increased en route flight time to the planned destination. Other designers have restricted the minimum speed at which the airplane operates. This also unnecessarily penalizes the performance of the airplane, resulting in increased fuel consumption. Enforcing the maximum altitude and/or minimum speed at which the airplane operates not only carries economic penalties, but such restrictions still may not prevent the airplane from operating in a regime where a turn maneuver may result in a potential loss of altitude or airspeed.

Other designers have incorporated a manual bank angle limit selector switch into their particular autopilot flight director systems. This switch provides for manual pilot intervention when operating an autopilot flight director system in a heading or track mode. Pilot selection of a bank angle limit of between 5° and 30° is typically provided. The manual bank angle limit selector does not affect the bank angle limit, though, when operating the airplane in a fully automatic flight mode, where airplane roll guidance commands are generated exclusively by a flight management system (FMS).

Thus, a need exists for a method and means to effectively maneuver an airplane in a potentially thrust-limited turn condition so that flight can be sustained at the desired altitude and the desired air speed when operating in autoflight. The ideal method should be preventative in nature to avoid any uncommanded loss of energy (altitude and/or airspeed). The present invention is directed to fulfilling this need.

SUMMARY OF THE INVENTION

An improvement to a method of automatic flight using a flight management system is provided. The flight management system includes a lateral navigation (LNAV) control mode in which the flight management system calculates a roll angle and provides a bank angle command to effectuate lateral flight guidance using the calculated roll angle. The improvement includes evaluating the energy state of the airplane and calculating a thrust based roll limit as a function of the energy state of the airplane. The thrust based roll limit is compared to the calculated roll angle. The thrust based roll limit is applied to the bank angle command signal in lieu of the calculated roll angle for specific predefined flight conditions. The thrust based roll limit thereby avoids an uncommanded change in aircraft altitude and/or airspeed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A method of automated thrust-based roll guidance formed in accordance with the present invention is provided that automatically and dynamically invokes a bank angle maneuverability function when operating an airplane in a regime where the available thrust may limit the ability of the airplane to maintain the planned altitude and airspeed. The present invention uses a Flight Management Computer (FMC) to compute an appropriately limited bank angle command. An Autopilot Flight Director System (AFDS) uses the FMC-computed bank angle command to direct an autopilot to maintain the aircraft at the commanded bank angle during autoflight and provide appropriate flight director roll steering guidance to the pilot during manual flight. The present invention thus automatically sustains the aircraft at the desired altitude and the desired speed during a potential thrust-limited condition.

Figure 1:
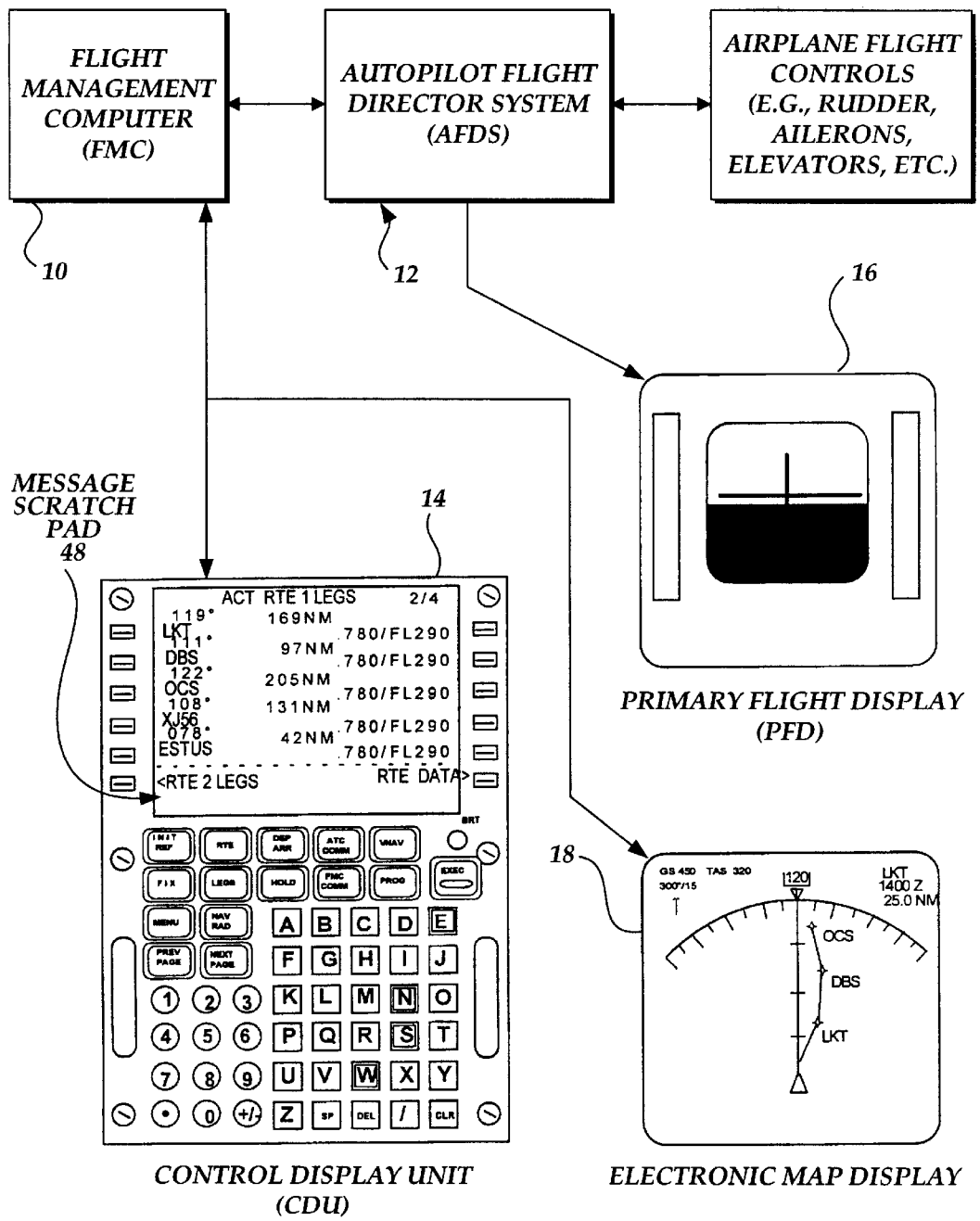
FIG. 1 is a system architecture diagram of a typical automatic flight guidance system.

Referring to FIG. 1, there shown are portions of an automated Flight Management System (FMS) including the Flight Management Computer (FMC) 10 and an Autopilot Flight Director System (AFDS) 12. The components of the FMS communicate with one another via various data busses.

The FMC calculates a wide range of flight information (including both lateral and vertical plans) that may be used in conjunction with the AFDS to automatically guide the aircraft according to pilot inputs and stored data. Types of information stored within the FMC memory include aircraft performance data and navigation information, e.g., data for VHF NAVAIDS, waypoints, airways, airports, runways, standard instrument departures, etc. The FMC can also accept crew entry of waypoints that are not stored in FMC permanent memory by means of a control display unit (CDU) 14. Using these tools, the pilot can define an entire flight plan in standard air traffic control language.

The AFDS comprises various avionic components (not shown) including an autothrottle system, an autopilot system, and a flight director system. The autothrottle system is capable of altering the engine thrust between idle and the maximum thrust for the currently specified thrust rating limit. The autopilot system is capable of initiating movement of the various aircraft control surfaces. The flight director system provides an electronic (or mechanical) display of roll and pitch guidance commands to the pilot for use while flying the airplane during manual flight.

During flight, the FMC compares the aircraft's present position (both laterally and vertically) with the planned position. Any deviations are indicated on various cockpit flight instruments. Shown in FIG. 1 are two such instruments—a primary flight display 16 and an electronic map display 18. The primary flight display 16 illustrates the aircraft attitude relative to the horizon, a roll steering command bar and a pitch steering command bar. The electronic map display 18 has multiple display modes, each generally indicating aspects of the lateral flight plan and the current airplane lateral position.

During flight, the FMC also calculates flight commands necessary to bring the aircraft in line with the planned position. These signals are referred to broadly as lateral navigation (LNAV) commands and vertical navigation (VNAV) commands. The FMC sends the LNAV and VNAV command signals to the AFDS, which in turn coordinates throttle, control surface, and flight director command bar movements to meet the commanded signals. In this manner, the FMS reduces pilot workload by automatically providing control inputs to the flight controls during autoflight, or steering commands to the pilot during manual flight, to manage the aircraft flight plan in both the lateral and vertical planes according to a pilot-defined flight plan.

The present invention is an improvement to the Flight Management System in which the FMC continuously evaluates the energy state of the airplane during turning maneuvers, and when necessary, the FMC limits (i.e., reduces) the bank-angle command to a value that will not result in the aircraft experiencing an uncommanded altitude or airspeed change.

In one embodiment formed in accordance with the present invention and described with reference to FIGS. 2–5, logic is provided within the FMC that is applied to lateral maneuvers such as direct flight to a waypoint, intercept of a course inbound to a waypoint, intercept of a course outbound from a waypoint, capture of an existing course, initiation and capture of an offset parallel route, acquisition and capture of a flight plan leg segment, flight through a planned en-route turn, entry into a holding pattern, and maintaining flight within a holding pattern. The improvement further provides flight crew alerting messages via the CDU under certain conditions. One embodiment of alerting message logic is described with reference to FIGS. 3 and 4.

Figure 2:
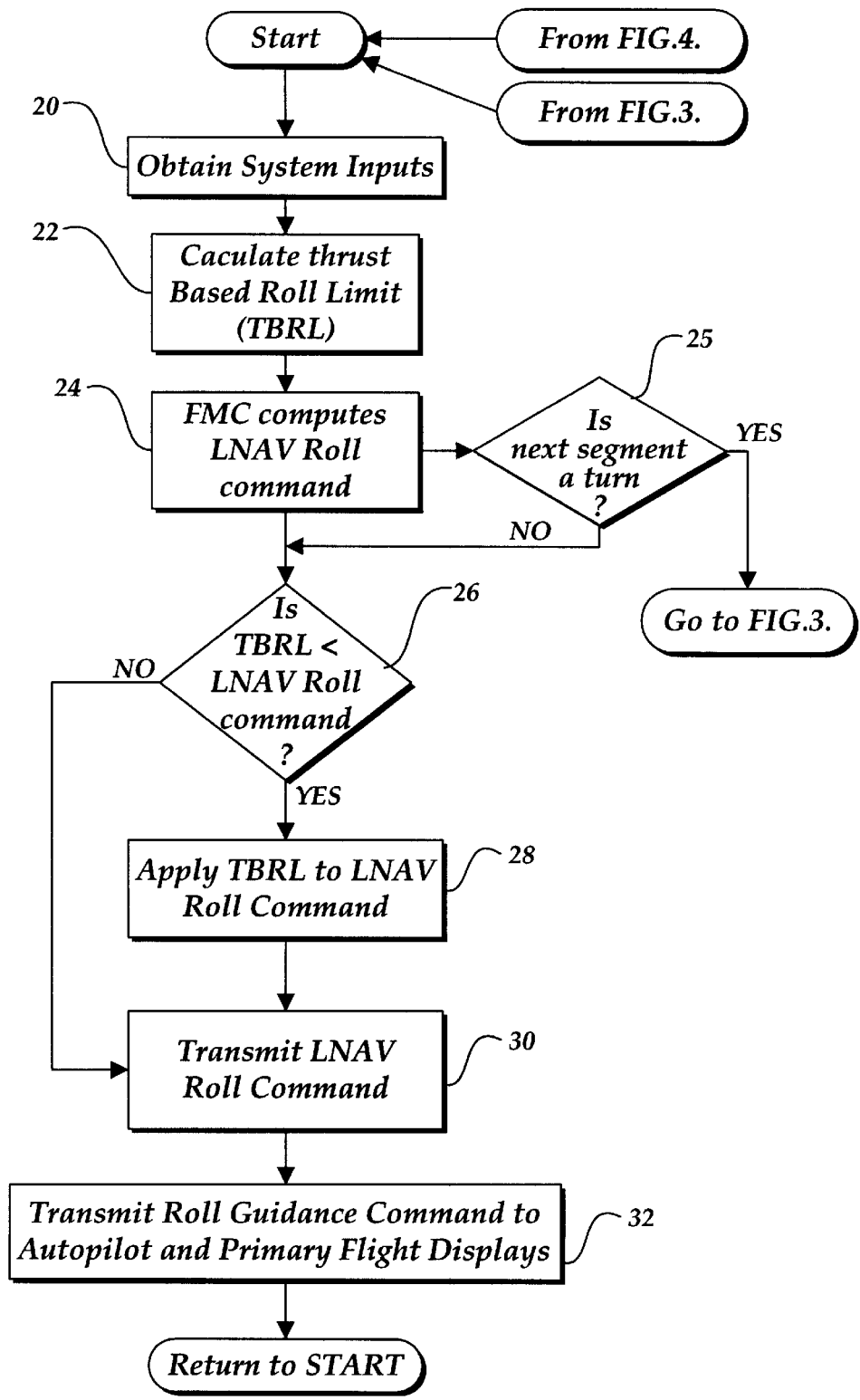
FIG. 2 is a logic diagram of a thrust-based roll angle command limiting system formed in accordance with the present invention.

Referring to FIG. 2, at step 20, the FMC obtains systems inputs reflective of various types of airplane state, engine, and performance data. In this embodiment, the inputs include airplane gross weight, airplane altitude, number of engines operating, autothrottle thrust limit, current speed, and next lateral maneuver data. Using this input data, a thrust-based roll limit (TBRL) is calculated at step 22. At step 24, the next LNAV roll command angle is computed by the FMC that is applicable to the next particular turn maneuver. The TBRL is compared to the LNAV roll command at decision block 26. If the TBRL is greater than the LNAV roll command to fly the particular maneuver, loss of altitude or airspeed is not expected. Therefore, the FMC continues according to its normal procedure at block 30 in guiding the aircraft through the next lateral maneuver and the TBRL is not applied. Because flight conditions can change rapidly, the present invention method preferably continuously monitors the TBRL for all airplane maneuvers while LNAV is engaged.

Should circumstances change to result in the TBRL being less than the LNAV roll command, the FMC applies the TBRL to the LNAV roll guidance command at step 28. The LNAV roll guidance command is transmitted to the AFDS at step 30. The AFDS transmits the command to the autopilot at step 32 to result in the aircraft being controlled to a bank angle sustainable without loss of altitude or airspeed. The AFDS further transmits the roll guidance command to the primary flight display 16 at step 32 or other display instruments as preferred.

Figure 5:
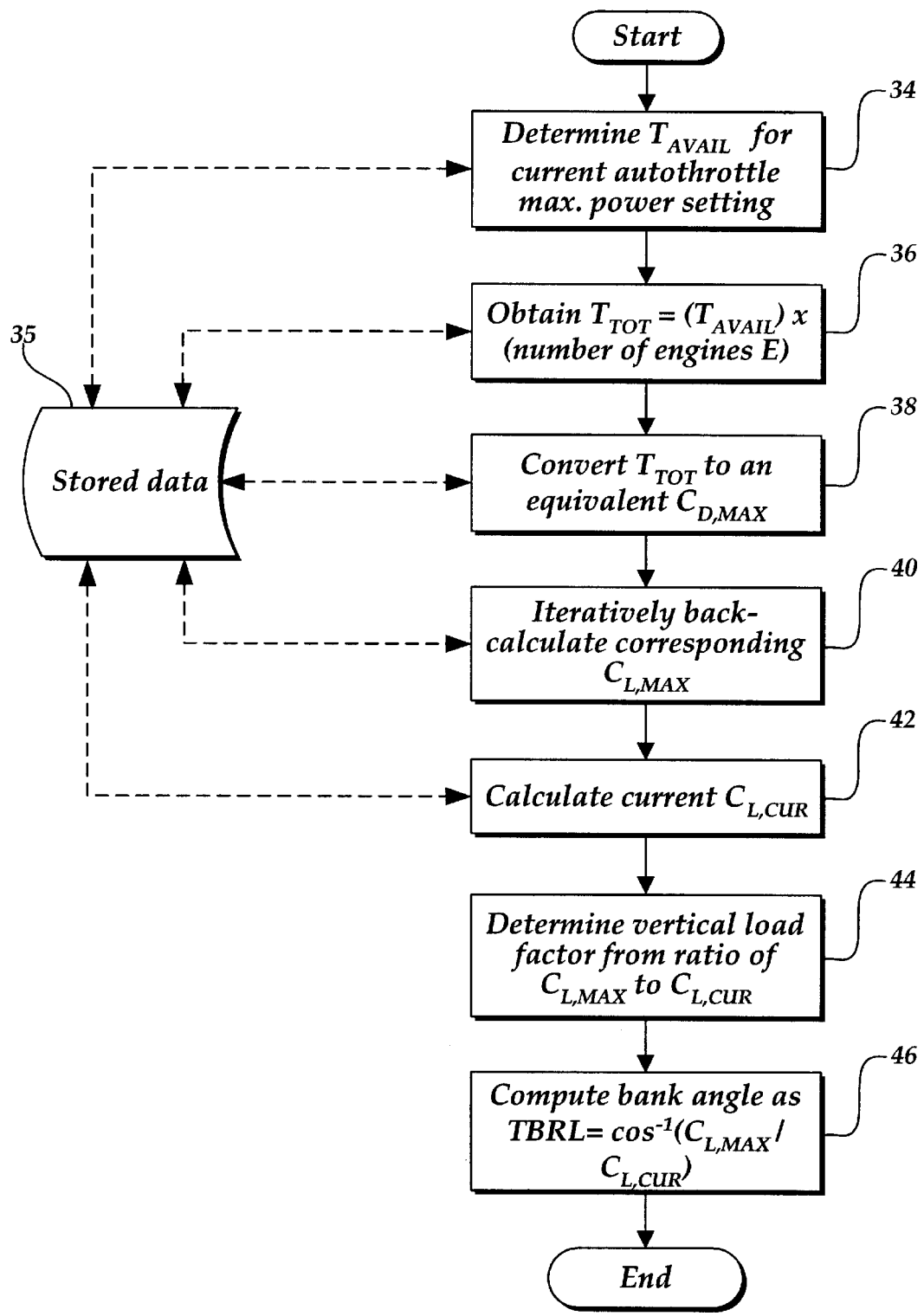
FIG. 5 is a logic diagram of one embodiment of logic used to calculate a thrust based roll limit, TBRL.

Referring to FIG. 5 is one embodiment of a method of calculating TBRL. A determination is initially made at step 34 as to the maximum thrust available $T_{AVAIL}$ at the maximum power setting currently allowed to the autothrottle system. The available thrust, $T_{AVAIL}$, at the currently specified thrust rating limit is determined from the stored FMC database 35 as a function of current pressure altitude, Mach number and total air temperature. This thrust is adjusted for real or assumed engine bleeds and power extraction. The total thrust available, $T_{TOT}$, is computed by multiplying the available thrust, $T_{AVAIL}$, by the current number of operating engines E at step 36. The total thrust available, $T_{TOT}$, is converted into an equivalent coefficient of drag, $C_{D,MAX}$, at step 38 using basic aerodynamic relationships and the current pressure altitude, Mach number, and airplane reference data stored in the FMC memory 35. The coefficient of lift at the maximum available thrust condition, $C_{L,MAX}$, is iteratively back-calculated at step 40 from the coefficient of drag, $C_{D,MAX}$. This iterative back-calculation of $C_{L,MAX}$ is performed using a flaps-up airplane drag polar ($C_D=f(C_L, Mach)$) and the accompanying drag adjustments for off-nominal altitude, gross weight, and airplane configuration that comprise the airplane drag model contained in the FMC database. The iteration continues until a $C_{L,MAX}$ is found that results in a drag coefficient equal to $C_{D,MAX}$. Next, a current level flight coefficient of lift, $C_{L,CUR}$, is calculated at step 42, also using current FMC gross weight, current Mach number, current pressure altitude, and the necessary reference data from the FMC database 35. A vertical load factor is calculated at step 44 based on the ratio of the maximum lift coefficient, $C_{L,MAX}$, to the current coefficient, $C_{L,CUR}$. Geometrically, the maximum attainable bank angle at that altitude and airspeed is computed as the inverse cosine of $C_{L,MAX}/C_{L,CUR}$ at step 46. This angle represents the TBRL.

The TBRL is continuously computed when the energy state of the airplane is stable or decreasing. This stable or decreasing energy state is typically the state during a cruise or climb flight phase. However, when the energy state of the airplane is low, but is determined to be sufficiently increasing, the TBRL may be relaxed such that it no longer results in limiting of the LNAV roll guidance command. This increasing energy state normally happens during a descent flight phase. As an example, early in a descent flight phase, based on the current energy state, the TBRL may be a relatively low value that would significantly affect lateral maneuvering. But considering the rate and magnitude of the descent, it would be expected that the energy state would be increasing during the descent and that the airplane would be able to maintain the planned speed. The TBRL is therefore relaxed in anticipation of the higher energy state to be achieved at the end of the descent, permitting nominal lateral maneuvering during the descent. When the airplane levels off and the energy state is again stable, this computed TBRL is no longer relaxed and again may result in limiting of the LNAV roll guidance command.

Because the present invention results in limiting of the roll guidance command, it can result in the airplane flying wide of a pre-planned lateral path for an en-route turn. Likewise, use of the TBRL can result in the aircraft being unable to maintain a predefined holding pattern at its pre-planned turn radius. To alert the pilot as to why the aircraft is not flying the displayed planned lateral path, a message is preferably displayed in the CDU scratchpad 48. If the present invention will cause the airplane to fly outside a protected holding airspace while active in holding, a separate message is provided and displayed in the CDU scratchpad 48. Other cockpit displays may also provide alerting messages, as deemed necessary or desirable for a particular application.

Figure 3:
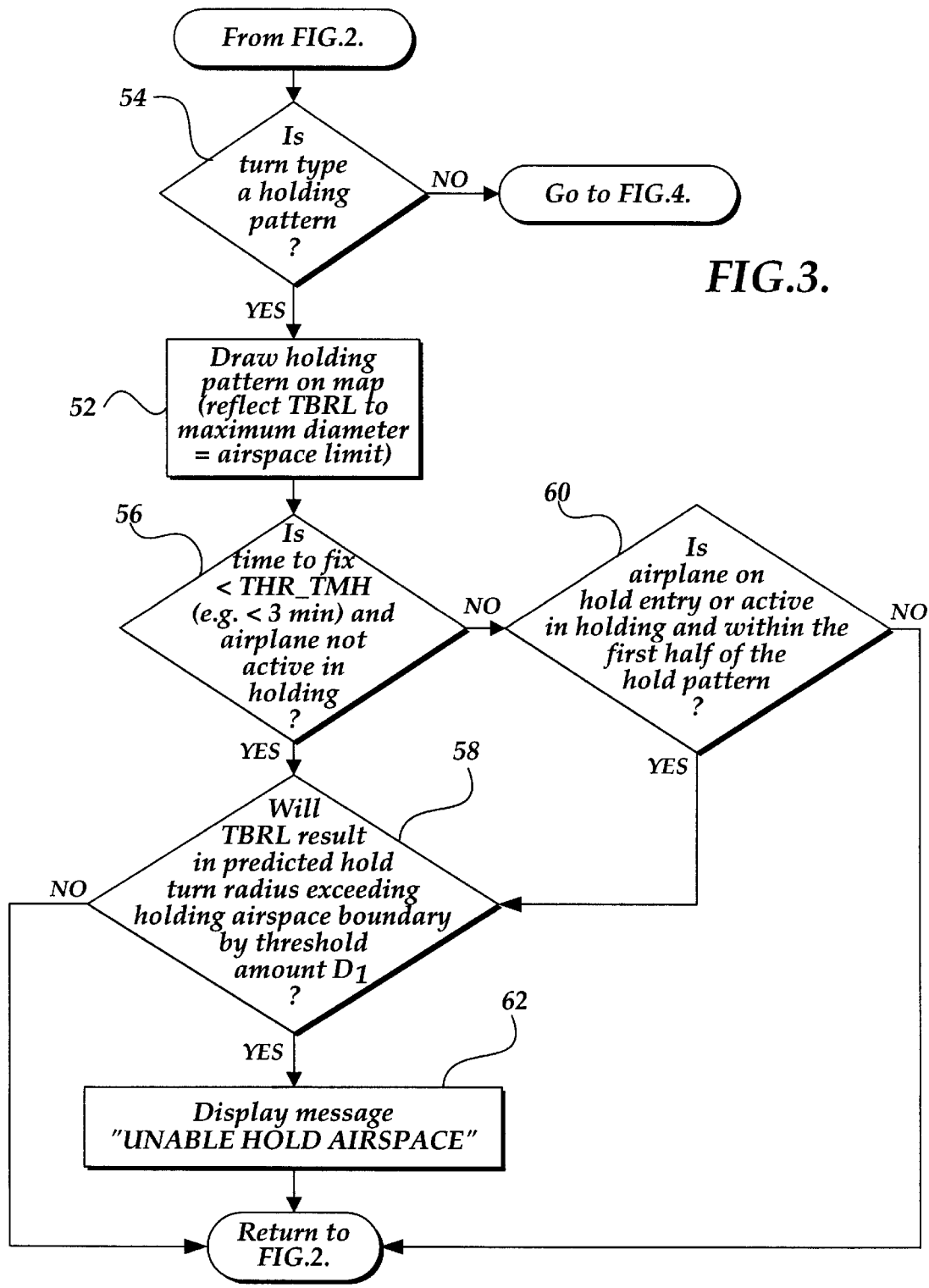
FIGS. 3 and 4 are logic diagrams of one embodiment of messaging logic used with the system of FIG. 2.
Figure 4:
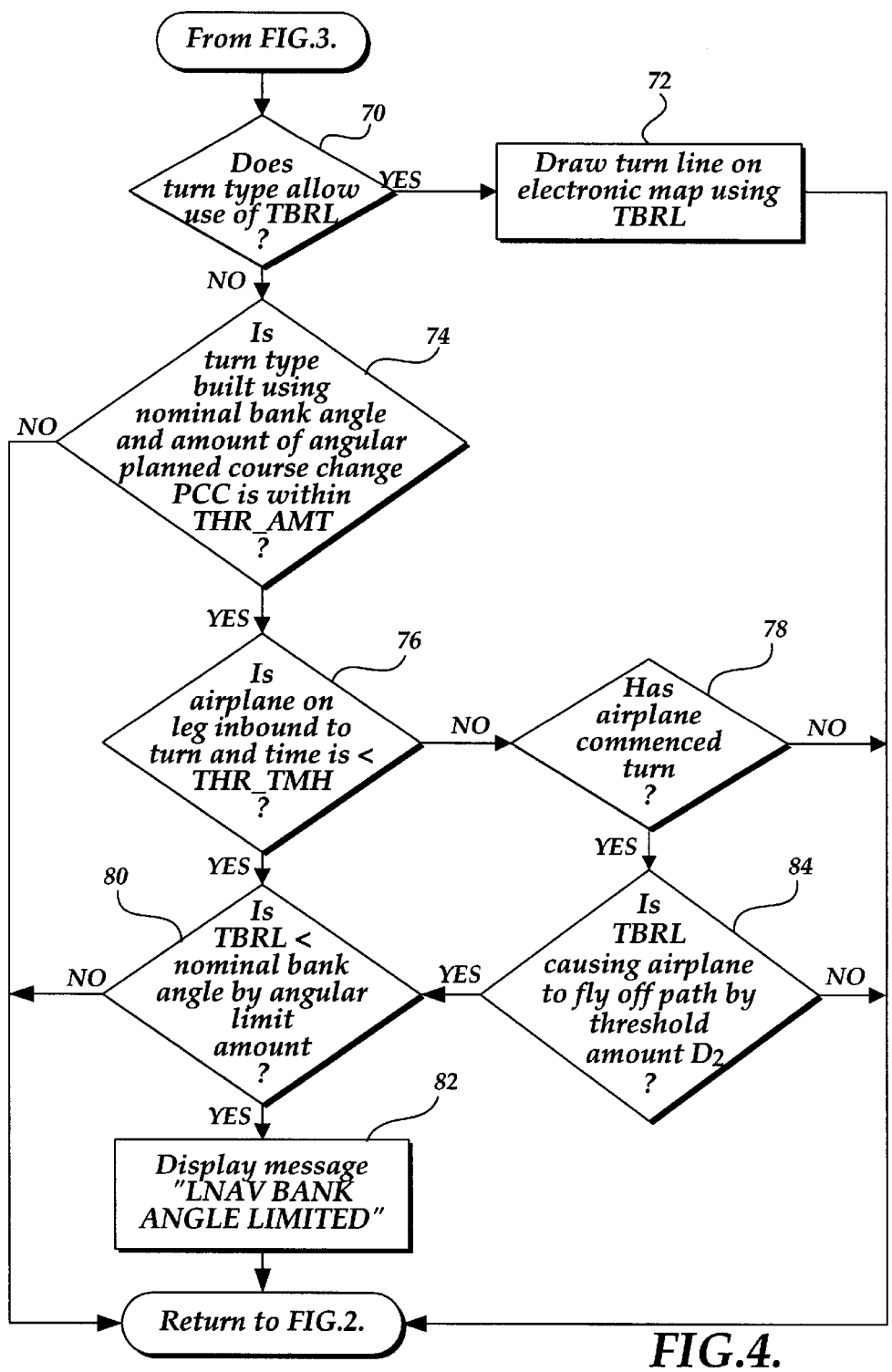

One embodiment of logic for use in determining the best instance of providing a message to the pilot is presented with reference to FIGS. 3 and 4. An inquiry is made at block 25 in FIG. 2 to determine whether the upcoming or current segment is a turn maneuver. If so, the messaging logic is performed. The type of message to be displayed depends on the type of lateral maneuver that is planned or that is in progress. Referring to FIG. 3, this logic is used if the planned or in progress lateral maneuver is a hold. FIG. 4 illustrates logic used if the planned or in progress lateral maneuver is a type of turn other than a hold. After making the determination of whether to set the message or not, the logic returns to the computation and application of the TBRL. (See FIG. 2.)

Referring to FIG. 3, for holding pattern circumstances as determined at query 54, the FMC will develop a racetrack pattern that is drawn about the holding fix, such as a waypoint. The FMC develops the pattern using a nominal bank angle amount (e.g., 25°), switching to use of the TBRL as necessary when computing the hold pattern size. If appropriate, the diameter of the hold pattern is expanded until reaching a predefined airspace boundary. The holding pattern is drawn at step 52. Thus, the airplane will be able to fly the hold pattern displayed on the electronic map under most conditions. In the event that the computed hold pattern diameter would be larger than the airspace boundary, the diameter of the hold pattern, as displayed on the electronic map, is limited to be equal to the airspace boundary. The airplane would then be expected to fly wide of the displayed pattern. Under these circumstances, a message is presented to the pilot.

When approaching a hold and the airplane is expected to fly a wider hold than a displayed hold pattern due to the TBRL, a message is presented to the pilot sufficiently early to allow the pilot to request additional airspace clearance. While the airplane is actively flying each circuit of the hold and the airplane is expected to exceed the airspace boundary as represented by the displayed hold pattern, a message is presented to the pilot to indicate the thrust limited state of the airplane as the cause of the deviation.

Referring to FIG. 3, when the upcoming lateral maneuver is a holding pattern, as determined in step 54, the time to the holding fix is compared with a threshold time amount THR_TMH at decision block 56. If the time is less than THR_TMH, then at step 58, the FMC compares the predicted holding turn radius based on the TBRL and ground speed to be encountered during holding, with the predefined holding airspace boundaries. If the airplane is expected to exceed the predefined holding airspace boundaries by a certain threshold amount $D_1$ (see FIG. 6G), then a message is provided at step 62 to alert the pilot of the upcoming situation. Various messages may be used. For example, "UNABLE HOLD AIRSPACE" would be a logical choice for English-speaking pilots.

If the logic in item 56 results in a no, then a check is made at decision block 60 to determine whether the airplane is on a hold entry pattern or is currently active in holding and within the first half of the hold pattern. If not, the logic returns to the computation and checking of TBRL for application to en-route turns. If the airplane is in an entry to a hold pattern or is active in holding and is within the first half of the pattern from the holding fix at query 60, logic continues to step 58 to determine whether the TBRL will result in the airplane exceeding predefined holding airspace boundaries by the threshold amount $D_1$. If so, the "UNABLE HOLD AIRSPACE" message is displayed to the pilot at step 62. The message is removed from the cockpit displays when cleared by the pilot or when the upcoming or current maneuver is no longer a hold.

If the upcoming or in progress lateral maneuver is not a hold, the particular turn type is used to determine whether a message should be presented to the pilot. If the turn type is such that a lateral path may be built taking into consideration the TBRL, thus expanding the radius of the turn such that the airplane will fly the path displayed on the electronic map, it is again not necessary to display a message to the pilot. If the turn type is such that the lateral path uses a pre-determined nominal bank angle to construct the curved path, not accounting for the TBRL, such that the airplane may fly wide of the path displayed on the electronic map, a message is presented to the pilot. However, on this type of turn, if the planned course change, PCC (see FIG. 6A), is outside of a predefined angular range THR_AMT (e.g., 3° to 135°), it is not necessary to display a message to the pilot. When approaching such a turn and it is expected that the airplane will deviate from the displayed path due to the TBRL, the message is presented to the pilot sufficiently early to allow the pilot to request additional airspace clearance. While actively flying such a turn and deviating from the displayed planned path due to the TBRL by a threshold distance $D_2$, the message is presented to the pilot to indicate the thrust limited state of the airplane as the cause of the deviation.

One embodiment of this message setting logic is shown in FIG. 4. At step 70, determination is made whether the turn type is one in which a lateral curved path for the turn may be built and displayed taking into consideration the TBRL. If so, a message is not displayed. The turn line is drawn on the display using TBRL at step 72. If not, at step 74, determination is made whether the turn is a type that uses a pre-determined nominal bank angle and whether the amount of the planned course change, PCC (see FIG. 6A), is within the predefined angular range THR_AMT. If not, a message is not displayed. If so, determination is made at block 76 whether the airplane is on the inbound leg to turn and there is less than a threshold time THR_TMH remaining before turn initiation. If so, the logic continues to item 80 to determine whether TBRL is less than the nominal bank angle by an angular limit amount $A_1$. If so, a message is displayed to the pilot at block 82. For example, "LNAV BANK ANGLE LIMITED" is one example of a message that would be meaningful to English-speaking pilots.

If it is determined at step 76 that the airplane is not on the inbound leg to turn or that there is an amount equal to or greater than the threshold time, THR_TMH a query is made at item 78 to determine whether the airplane has commenced the turn. If not, the logic returns to FIG. 2. If so, the logic determines whether the use of TBRL is causing the airplane to currently exceed the planned turn radius by the threshold amount $D_2$ at item 84. If so, the message of item 82 is displayed to the pilot. In all cases, the present invention logic preferably returns to the computation and application of the TBRL on a continuing basis. The message is removed from the cockpit displays and the logic re-evaluated when cleared by the pilot or when a flight plan change or thrust limit mode change is made.

Based on the above-described method, the following functional results occur during en-route turns, direct-to a waypoint turns, intercept course to a waypoint turns, intercept course from a waypoint turns, capture of an existing course, intercept to a parallel offset, and flight in holding patterns.

Figure 6A:
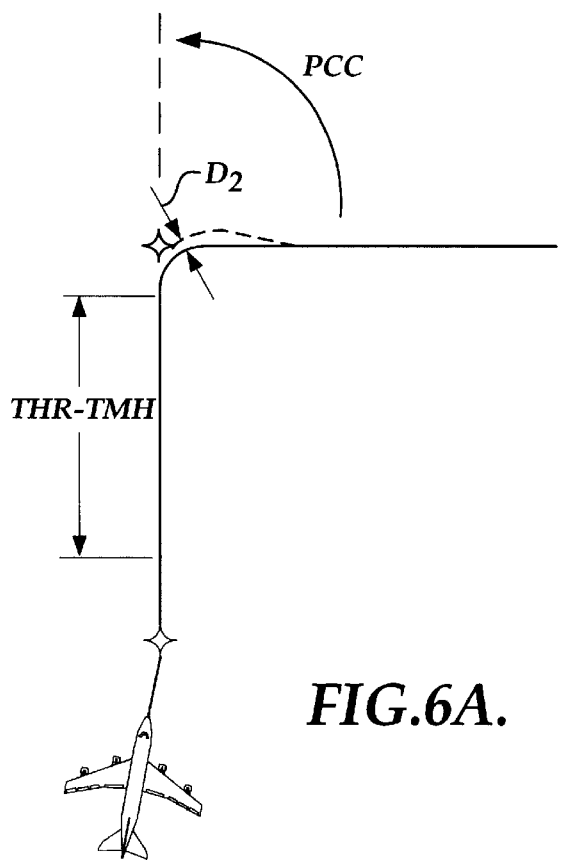
FIGS. 6A through 6G are displays of various types of FMC lateral flight plans as displayed on an electronic map display in the cockpit.

Referring to FIG. 6A, during an en-route turn the FMC evaluates the preplanned en-route turn to determine if the airplane will have sufficient thrust at the current thrust limit to complete the turn at the planned altitude and airspeed at the turn waypoint. If it is determined that the airplane will lose airspeed or altitude during the turn with engines operating at the thrust limit, the LNAV bank command is reduced to the FMC-calculated TBRL to ensure the turn can be completed at the planned altitude and airspeed.

If, because of the TBRL, the airplane is anticipated to deviate, or while actually flying the turn does deviate, from the track line drawn on the display map by more than $D_2$ nm at anytime during the turn, the CDU scratchpad message "LNAV BANK ANGLE LIMITED" is displayed. The evaluation of the TBRL is accomplished when sequencing on to the route leg prior to the en-route turn, though it is not used more than THR_TMH minutes prior to the next en-route arcuate turn portion. The evaluation of TBRL is also accomplished during the turn itself and in response to any flight plan modification or thrust limit change. The alerting message is not displayed for an en-route turn with a planned course change that is not within the THR_AMT angle limits, but the TBRL is still applied to the LNAV roll guidance command. The track line is not adjusted to reflect TBRL.

Figure 6B:
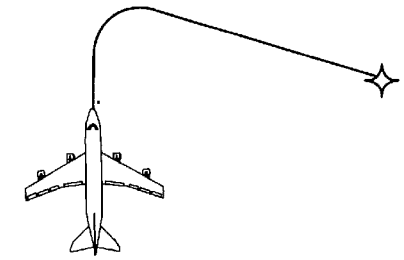

Referring to FIG. 6B, a direct-to a waypoint flight plan modification is evaluated by the FMC to determine if the airplane will have sufficient thrust at the current thrust limit to complete the turn at the planned altitude and airspeed. If it is determined that the airplane will lose airspeed or altitude during the turn with engines operating at the thrust limit, the LNAV bank command is reduced to the FMC-calculated TBRL to ensure the direct to turn can be completed at the planned altitude and airspeed and the depiction of the direct-to turn on the display map is adjusted to reflect TBRL. The "LNAV BANK ANGLE LIMITED" message is not displayed for this type of turn.

Figure 6D:
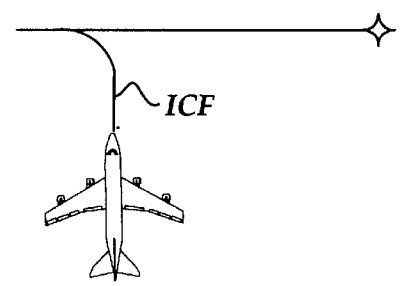
Figure 6C:
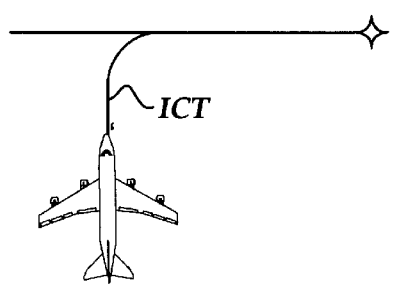

Referring to FIG. 6C, an intercept course to a waypoint (ICT) flight plan modification is evaluated by the FMC to determine if the airplane will have sufficient thrust at the current thrust limit to complete the intercept at the planned altitude and airspeed. If it is determined that the airplane will lose airspeed or altitude during the intercept maneuver with engines operating at the thrust limit, the LNAV bank command is reduced to the FMC-calculated TBRL to ensure the intercept can be completed at the planned altitude and airspeed. The starting point of the arcuate turn portion is positioned to ensure the desired course is intercepted without overshoot. The "LNAV BANK ANGLE LIMITED" message is not displayed for this type of turn.

Referring to FIG. 6D, an intercept course from a waypoint (ICF) flight plan modification is evaluated by the FMC to determine if the airplane will have sufficient thrust at the current thrust limit to complete the intercept at the planned altitude and airspeed. If it is determined that the airplane will lose airspeed or altitude during the intercept maneuver with engines operating at the thrust limit, the LNAV bank command is reduced to the FMC-calculated TBRL to ensure the intercept can be completed at the planned altitude and airspeed. The starting point of the arcuate turn portion is positioned to ensure the desired course is intercepted without overshoot. The depiction of the maneuver on the map is also adjusted to reflect the application of the TBRL. The "LNAV BANK ANGLE LIMITED" message is not displayed for this type of turn.

Figure 6E:
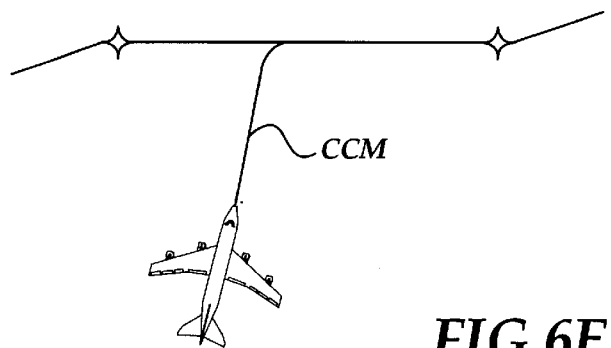

Referring to FIG. 6E, any course capture maneuver (CCM) is evaluated by the FMC to determine if the airplane will have sufficient thrust at the current thrust limit to complete the course capture at the planned altitude and airspeed. If it is determined that the airplane will lose airspeed or altitude during the course capture maneuver with engines operating at the thrust limit, the LNAV bank command is reduced to the FMC-calculated TBRL to ensure the capture can be completed at the planned altitude and airspeed. The starting point of the arcuate turn portion is positioned to ensure that the desired course is captured without overshoot. The "LNAV BANK ANGLE LIMITED" message is not displayed for this type of turn.

Figure 6F:
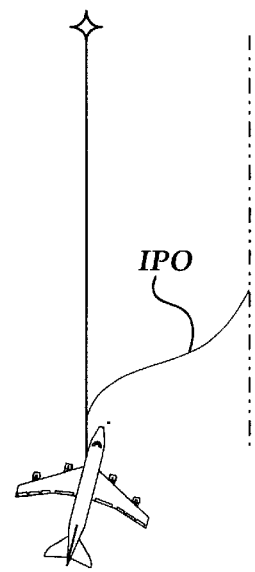

Referring to FIG. 6F, an intercept of a parallel offset route (IPO) flight plan modification is evaluated by the FMC to determine if the airplane will have sufficient thrust at the current thrust limit to complete the intercept at the planned altitude and airspeed. If it is determined that the airplane will lose airspeed or altitude during the intercept maneuver with engines operating at the thrust limit, the LNAV bank command is reduced to the FMC-calculated TBRL to ensure the intercept can be completed at the planned altitude and airspeed. The "LNAV BANK ANGLE LIMITED" message is not displayed for this type of turn.

Figure 6G:
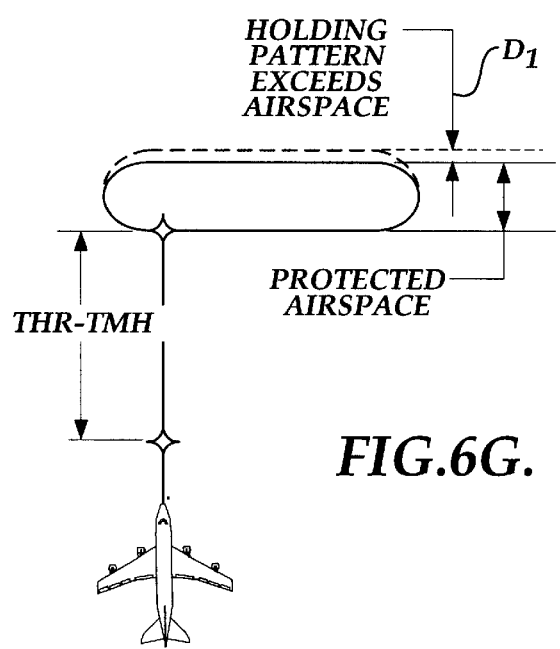

Referring to FIG. 6G, the next holding pattern in the flight plan is evaluated by the FMC to determine if the airplane will have sufficient thrust at the current thrust limit to fly the holding pattern at the planned altitude and airspeed. If it is determined that the airplane will lose airspeed or altitude during the holding pattern with engines operating at the thrust limit, the LNAV bank command is reduced to the FMC-calculated TBRL to ensure the holding pattern can be flown at the planned altitude and airspeed. If, because of the TBRL, the computed hold pattern size exceeds the protected holding airspace at anytime during the holding pattern, the CDU scratchpad message "UNABLE HOLD AIRSPACE" is displayed. The evaluation of the TBRL is accomplished when sequencing onto the leg prior to the holding pattern, but not more than THR_TMH minutes prior to the next holding pattern. The evaluation of TBRL is also accomplished during entry to the hold pattern and while flying the first half of the holding pattern after each subsequent crossing of the holding fix.

As will be appreciated from a reading of the above, the present invention continuously monitors the airplane energy state during turn maneuvers and, if necessary, limits the LNAV bank angle command to permit continued flight at the current commanded speed and altitude. The present invention is thus preventative in nature, avoiding uncommanded loss of energy during potentially thrust limited turn conditions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a method of automatic flight using a flight management system having a lateral navigation control mode in which the flight management system calculates a roll angle and provides a bank angle command signal to effectuate lateral flight guidance using the calculated roll angle, an improvement comprising:
    (a) evaluating the energy state of the airplane and calculating a thrust based roll limit as a function of the energy state of the airplane;
    (b) comparing the thrust based roll limit to the calculated roll angle; and
    (c) using the lesser of the thrust based roll limit and the calculated roll angle as the bank angle command signal; whereby the thrust based roll limit avoids an uncommanded change in aircraft altitude and/or airspeed.

2. The improvement according to claim 1, wherein the thrust based roll limit is calculated as a function of the ratio of the current level flight coefficient of lift to the maximum available coefficient of lift.

3. The improvement according to claim 2, wherein the maximum available coefficient of lift is a function of the current thrust limit.

4. The improvement according to claim 1, further comprising providing a flight crew alerting message during flight using the thrust based roll limit as the bank angle command signal.

5. The improvement according to claim 1, wherein the thrust based roll limit is applied to the bank angle command signal during at least one of the group of turn maneuvers commanded by the FMS including direct flight to a waypoint, intercept of a course inbound to a waypoint, intercept of a course outbound from a waypoint, capture an existing course, initiating and capture of an offset parallel route, acquisition and capture of a flight plan leg segment, flight through a planned en route turn, entry into a holding pattern, and maintaining flight within a holding pattern.

6. The improvement according to claim 1, further comprising accounting for the thrust based roll limit in the construction of direct-to and intercept-from turn types and visually indicating the adjusted turn path when the turn maneuver is displayed on an electronic map.

7. The improvement according to claim 1, further comprising visually indicating an increased size of a holding pattern on an electronic map resulting from use of the thrust based roll angle up to a maximum size representing a predefined airspace boundary limit.

8. In a method of automatic flight using a flight management system having a lateral navigation control mode in which the flight management system calculates a roll angle and provides a bank angle command signal to effectuate lateral flight guidance using the calculated roll angle, an improvement comprising:
    (a) evaluating the energy state of the airplane and calculating a thrust based roll limit as a function of the energy state of the airplane;
    (b) comparing the thrust based roll limit to the calculated roll angle;
    (c) using the lesser of the thrust based roll limit and the calculated roll angle as the bank angle command signal; whereby the thrust based roll limit avoids an uncommanded change in aircraft altitude and/or airspeed; and
    (d) providing a flight crew alerting message when a predicted holding turn radius exceeds a holding boundary defined by pre-determined airspace regulations and one of at least two circumstances exist, a first circumstance being an upcoming maneuver is a holding pattern and time remaining to the holding pattern is within a threshold time amount THR__TMH, a second circumstance being when on a hold entry or when active in holding and the aircraft is flying a first half of the hold.

9. The improvement according to claim 8, wherein the predicted holding turn radius is calculated based on at least one of the calculated roll angle, the thrust based roll limit, and a ground speed anticipated during holding.

10. The improvement according to claim 8, wherein the threshold time amount THR__TMH is a value of about 3 minutes.

11. The improvement according to claim 8, wherein the flight crew alerting message is "UNABLE HOLD AIRSPACE".

12. The improvement according to claim 11, wherein the flight crew alerting message "UNABLE HOLD AIRSPACE" may be manually cleared by the pilot or is automatically cleared when a holding pattern is no longer the upcoming or active lateral path.

13. In a method of automatic flight using a flight management system having a lateral navigation control mode in which the flight management system calculates a roll angle and provides a bank angle command signal to effectuate lateral flight guidance using the calculated roll angle, an improvement comprising:
    (a) evaluating the energy state of the airplane and calculating a thrust based roll limit as a function of the energy state of the airplane;
    (b) comparing the thrust based roll limit to the calculated roll angle;
    (c) using the lesser of the thrust based roll limit and the calculated roll angle as the bank angle command signal; whereby the thrust based roll limit avoids an uncommanded change in aircraft altitude and/or airspeed; and
    (d) providing a flight crew alerting message when the lateral path for the next turn maneuver is a curved path transition constructed using a nominal bank angle and includes a turn angle PCC that is within an angular threshold range THR__AMT; and one of the following is true:
        (a) the aircraft is on an inbound leg to turn, the time to the turn is less than a threshold time amount THR__TMH; the thrust based roll limit is less than the nominal bank angle by a first threshold amount; and
        (b) the aircraft has commenced the turn and use of the thrust based roll limit is causing the aircraft to fly off path by a threshold amount $D_2$ and the thrust based roll limit is less than the nominal bank angle by a second threshold amount.

14. The improvement according to claim 13, wherein the angular threshold range THR__AMT is about 3 degrees to about 135 degrees.

15. The improvement according to claim 13, wherein the threshold time amount THR__TMH is about 5 minutes.

16. The improvement according to claim 13, wherein the threshold amount $D_2$ is about 1 nm.

17. The improvement according to claim 13, wherein the flight crew alerting message is "LNAV BANK ANGLE LIMITED".

18. The improvement according to claim 17, wherein the flight crew alerting message "LNAV BANK ANGLE LIMITED" may be manually cleared by the pilot or is automatically cleared and re-evaluated following a flight plan modification or a thrust limit mode change.

19. In a method of automatic flight using a flight management system having a lateral navigation control mode in which the flight management system calculates a roll angle and provides a bank angle command signal via a flight director system to the pilot during manual flight or to an autopilot during autoflight to effectuate lateral flight guidance using the calculated roll angle, an improvement comprising:

(a) evaluating the energy state of the airplane during the LNAV control mode and calculating a thrust based roll limit as a function of the energy state of the airplane;

(b) comparing the thrust based roll limit to the calculated roll angle;

(c) using the lesser of the thrust based roll limit and the calculated roll angle as the bank angle command signal; whereby the thrust based roll limit avoids an uncommanded change in aircraft altitude and/or airspeed; wherein use of the thrust based roll limit avoids an uncommanded change in aircraft altitude and/or airspeed; and (d) providing a flight crew alerting message during one or more predefined lateral maneuvering conditions.

* * * * *